US012801205B2

(12) United States Patent
Shetty et al.

(10) Patent No.: US 12,801,205 B2
(45) Date of Patent: Nov. 17, 2026

(54) POWER CAPPING BASED ON CARBON GENERATION BY DATA PROCESSING SYSTEMS

(71) Applicant: Dell Products L.P., Round Rock, TX (US)

(72) Inventors: Sudhir Vittal Shetty, Cedar Park, TX (US); Shivendra Katiyar, Bangalore (IN); Rhushabh Bhandari, Pflugerville, TX (US); Ravi Kumar Palle, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/940,405

(22) Filed: Nov. 7, 2024

(65) Prior Publication Data

US 2026/0126847 A1 May 7, 2026

(51) Int. Cl.
*G06F 1/3296* (2019.01)

(52) U.S. Cl.
CPC .................................. *G06F 1/3296* (2013.01)

(58) Field of Classification Search
CPC ..................................................... G06F 1/3296
See application file for complete search history.

(56) References Cited

U.S. PATENT DOCUMENTS

| | | | | |
|---|---|---|---|---|
| 11,782,490 | B2 * | 10/2023 | Katiyar | G06F 9/5094 713/340 |
| 2009/0231152 | A1 * | 9/2009 | Tung | G06F 1/206 340/660 |
| 2012/0053925 | A1 * | 3/2012 | Geffin | H05K 7/1498 703/21 |
| 2012/0226922 | A1 * | 9/2012 | Wang | G06F 1/3203 713/320 |
| 2013/0116803 | A1 * | 5/2013 | Gmach | G05B 19/042 700/33 |
| 2021/0149351 | A1 * | 5/2021 | Radovanovic | G05B 13/048 |
| 2023/0367653 | A1 * | 11/2023 | Kumbhare | G06F 1/26 |
| 2024/0012459 | A1 * | 1/2024 | Guim Bernat | G06F 1/266 |
| 2024/0264652 | A1 * | 8/2024 | Sethi | G06F 1/3246 |
| 2025/0085769 | A1 * | 3/2025 | Kommula | H04L 41/5009 |

* cited by examiner

*Primary Examiner* — Phil K Nguyen
(74) *Attorney, Agent, or Firm* — WOMBLE BOND DICKINSON (US) LLP

(57) ABSTRACT

Methods and systems for managing power consumption by data processing systems are disclosed. The power consumption may be managed by forecasting power consumption and optimizing power caps based on the power consumption forecasts and a carbon generation limit. The power consumption may be forecasted by ingesting telemetry data from data processing systems into a power consumption forecasting analysis and obtaining future power consumption forecasts. The power caps may be optimized by ingesting the future power consumption forecasts and forecasted carbon emissions. The carbon generation limit may include a limit on how much carbon (e.g., carbon dioxide) that a data processing system is allowed to produce. After optimization, the power caps may be implemented in the data processing systems.

20 Claims, 8 Drawing Sheets

POWER CAPPING BASED ON CARBON GENERATION BY DATA PROCESSING SYSTEMS

FIELD

Embodiments disclosed herein relate generally to managing power consumption by data processing systems. More particularly, embodiments disclosed herein relate to setting power caps of data processing systems based on a carbon generation limit.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
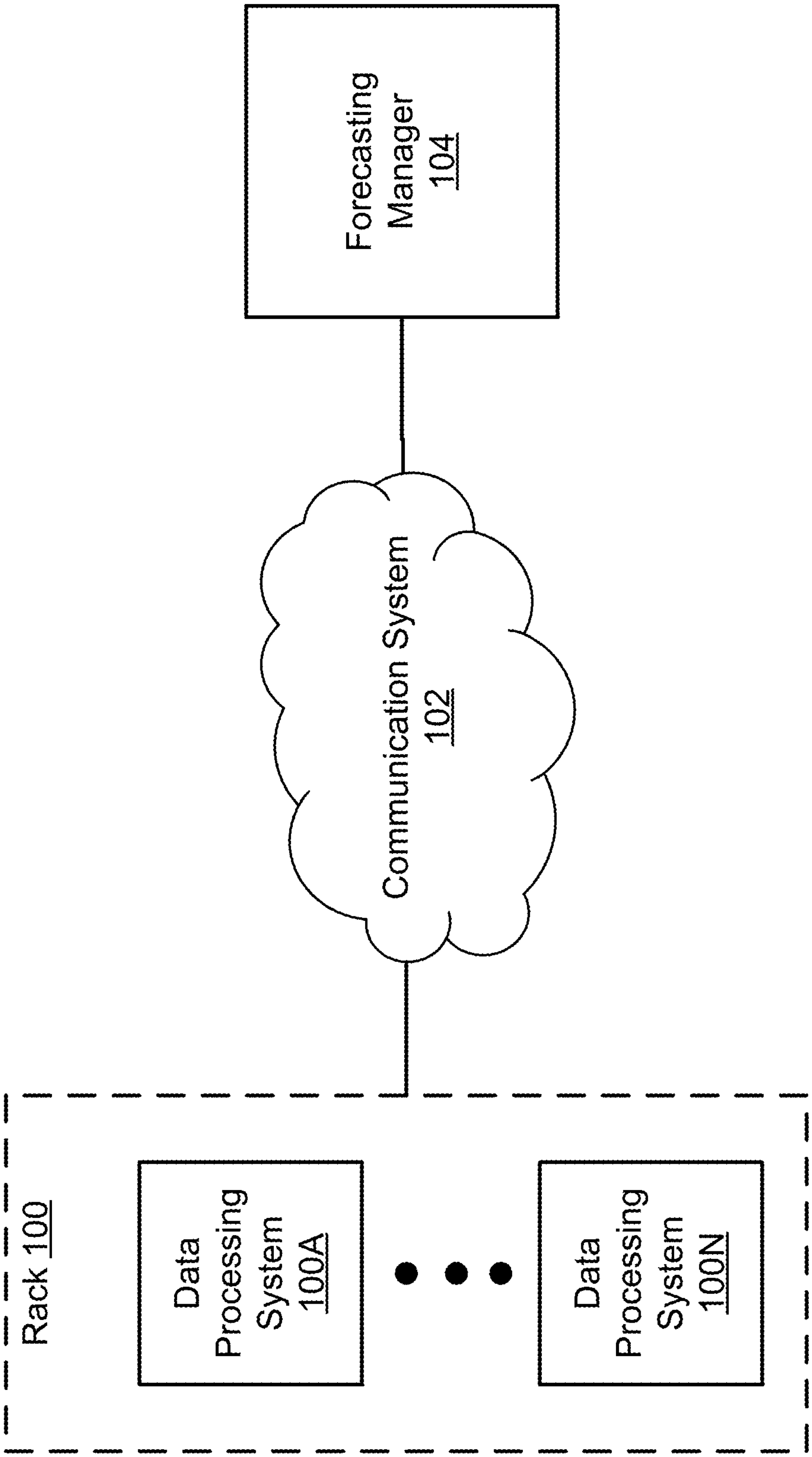
FIGS. 1A-1B show diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing power consumption by data processing systems. The power consumption may be managed by forecasting power consumption and optimizing power caps using the power consumption forecasts and a carbon generation limit.

The power consumption may be forecasted by ingesting telemetry data from data processing systems in a rack into a power consumption forecasting analysis and obtaining future power consumption forecasts. The power caps may be optimized by ingesting the future power consumption forecasts and modulating the power caps in an objective function for the data processing systems.

The power caps may be modulated in the objective function to sufficiently allocate power over all the data processing systems. The objective function may include a carbon generation limit as a constraint. The carbon generation limit may include a limit on how much carbon (e.g., carbon dioxide) that a data processing system is allowed to produce. The data processing system may produce the carbon by consuming power (e.g., electricity), which indirectly leads to a carbon emission. The consumption of the power may indirectly lead to the carbon emission because the power is generated from fossil fuels (e.g., coal, natural gas, etc.). The carbon generation limit may be mandated by at least one administrative regulation.

Once the power caps are determined that sufficiently allocate power over all the data processing systems, a power cap of the power caps may be ingested by a baseboard management controller of a data processing system of the data processing systems. The power cap may be implemented by the baseboard management controller for the data processing system.

In an embodiment, a method for managing power consumption by data processing systems is disclosed. The method may include: (i) obtaining telemetry data based on power consumption by each data processing system of a portion of the data processing systems positioned in a rack, a power consumption being during a first period of time, (ii) performing, based on the telemetry data, a power consumption forecasting analysis to obtain a respective power consumption forecast for each data processing system of the portion of the data processing systems for a second future period of time to obtain future power consumption forecasts, (iii) obtaining, using the future power consumption forecasts, an optimization model, a rack level power limit for the rack, and a carbon generation limit for the data processing systems, a respective power cap for each data processing system of the portion of the data processing systems to obtain power caps, and (iv) updating operation of each data processing system of the portion of the data processing systems based on a corresponding power cap of the power caps to limit aggregate power consumption of the portion of the data processing systems to be within the rack level power limit and aggregate carbon generation by the data processing systems to be within the carbon generation limit while computer implemented services are provided.

Obtaining the respective power cap for each data processing system of the portion of the data processing systems may include (i) ingesting, by the optimization model, the future power consumption forecasts, the rack level power limit for the rack, and the carbon generation limit, (ii) performing, using the optimization model, the future power consumption forecasts, the carbon generation limit, and the rack level power limit for the rack, an optimization of the respective power cap for each data processing system of the portion of the data processing systems, and (iii) obtaining, from the optimization model, the power caps to limit.

Performing the optimization may include using a forecasted carbon intensity for power generation during the second future period of time to estimate carbon generation due to each power cap for each data processing system.

The forecasted carbon intensity may specify a rate of carbon generated for generation of power during the second future period of time.

The carbon generation limit may specify a maximum amount of carbon authorized for emission into an environment due to operation of the data processing systems.

The carbon generation limit may be for an aggregate limit for a prescribed duration of time.

The rack level power limit may be a maximum amount of power that is able to be supplied to the rack.

In an instance of the obtaining, the power caps in aggregate may be less than the rack level power limit.

In the instance of the obtaining, the carbon generation limit may restrict power consumption by the data processing systems to be less than the rack level power limit.

The carbon generation limit may be used as a constraint in an optimization process that incentivizes power consumption by the data processing systems up to the rack level power limit.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, a data processing system may use at least one hardware and at least one software component. To use the at least one hardware and the at least one software component, power may be consumed by the data processing system. During at least one time, a power consumption by the data processing system may need to be limited. If the power consumption cannot be limited, then at least one administrative regulation may be violated.

In general, embodiments disclosed here relate to systems and methods for managing power consumption by data processing systems to provide computer implemented services.

The power consumption may be managed by forecasting the power consumption needs and optimizing power caps using power consumption forecasts.

The power consumption may be forecasted by ingesting telemetry data from data processing systems in a rack into a power consumption forecasting analysis and obtaining future power consumption forecasts. The power caps may be optimized by ingesting the future power consumption forecasts and/or a carbon generation limit and/or modulating the power caps for the data processing systems to sufficiently allocate power over all the data processing systems.

The telemetry data may be recorded from a baseboard management controller for a data processing system of the data processing systems. The telemetry data may include historical power consumption data for the data processing systems. The telemetry data may be ingested by a forecasting algorithm of a set of forecasting algorithms that have been trained to forecast power consumption. From the forecasting algorithm, future power consumption forecasts may be generated. A future power consumption forecast of the future power consumption forecasts may include power consumption levels for a series of future times.

The carbon generation limit may include a limit on how much carbon (e.g., carbon dioxide) that a data processing system is allowed to produce. The data processing system may produce the carbon by consuming power (e.g., electricity), which indirectly leads to a carbon emission. The consumption of the power may indirectly lead to the carbon emission because the power is generated from fossil fuels (e.g., coal, natural gas, etc.). The carbon generation limit may be mandated by at least one administrative regulation.

The future power consumption forecasts may be received from the forecasting algorithm by a power recommendation engine. The power recommendation engine may ingest the future power consumption forecasts into an objective function. The objective function may be set equal to under-allocated power to a rack and be a function of the future power consumption forecasts and power caps for each of the data processing systems. The under-allocated power may be the power that is not available to a data processing system and therefore causes a loss in performance.

The objective function may be solved by the power cap recommendation engine. The objective function may be solved by modulating the power caps for each of the data processing systems so that power may completely distributed to the data processing systems in the rack. Further, the power caps may be modulated so that forecasted carbon emissions for each of the data processing systems do not exceed a total carbon emission allowed for the rack. Once the power caps have been computed that satisfy the objective function, then the power cap recommendation engine may send a power cap of the power caps to a baseboard management controller of a data processing system. The baseboard management controller may implement the power cap for the data processing system.

To provide the above noted functionality, the system may include rack 100 and forecasting manager 104. Each of these components is discussed below.

Rack 100 may be a supporting framework for data processing system 100A-100N and may include a power supply unit to power data processing system 100A-100N. Data processing system 100A-100N may be enclosed in a chassis, which may include hardware components such as GPUs/CPUs, a motherboard, and/or storage device. Data processing system 100A-100N may also include a baseboard management controller.

Figure 1B:
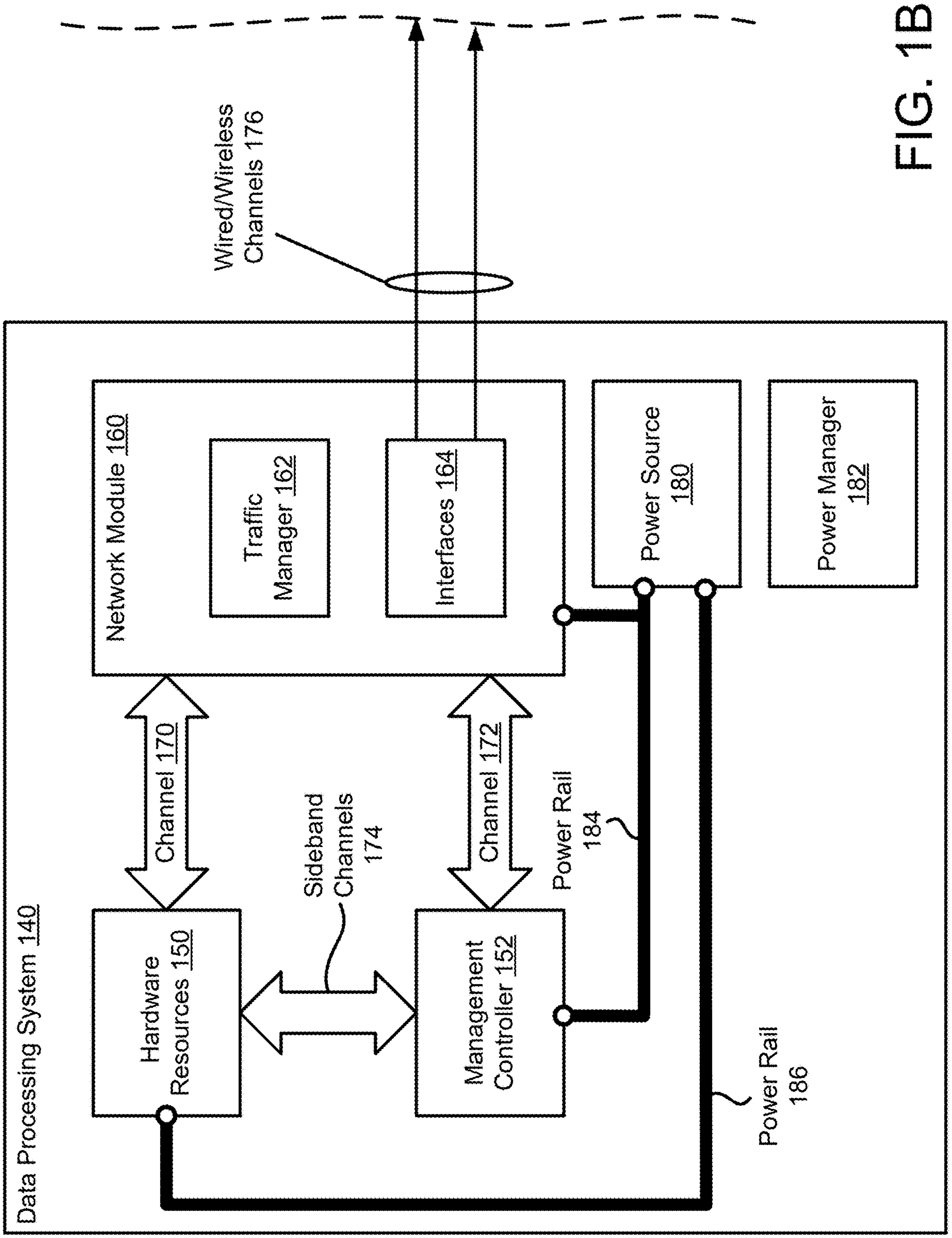

The baseboard management controller, shown in FIG. 1B, may generate telemetry data that includes historical power consumption. The telemetry data may be sent to forecasting manager 104 to generate future power consumption forecasts for data processing system 100A-100N. After receiving the future power consumption forecasts from forecasting manager 104, data processing system 100A-100N may utilize a power recommendation engine. The power recommendation engine may ingest the future power consumption forecasts and carbon emission forecasts to determine power caps to implement across data processing system 100A-100N. The carbon emission forecasts may be determined using a carbon emissions calculator. The carbon emissions calculator may use account for power consumption of data processing system 100A-100N based on time of day, location, etc. The power consumption may be converted into the carbon emission forecasts using an emission conversion factor. Implementation of the power caps across data processing system 100A-100N may prevent under-allocation of power and use all available power in rack 100.

Forecasting manager 104 may receive telemetry data from data processing system 100A-100N. The telemetry data may be ingested in a forecasting algorithm of a set of forecasting algorithms. The forecasting algorithm may use the telemetry data, which may include historical power consumption for data processing system 100A-100N, to generate future power consumption forecasts for data processing system 100A-100N. The future power consumption forecasts may be sent to rack 100 for optimization of power caps for data processing system 100A-100N.

Figure 2A:
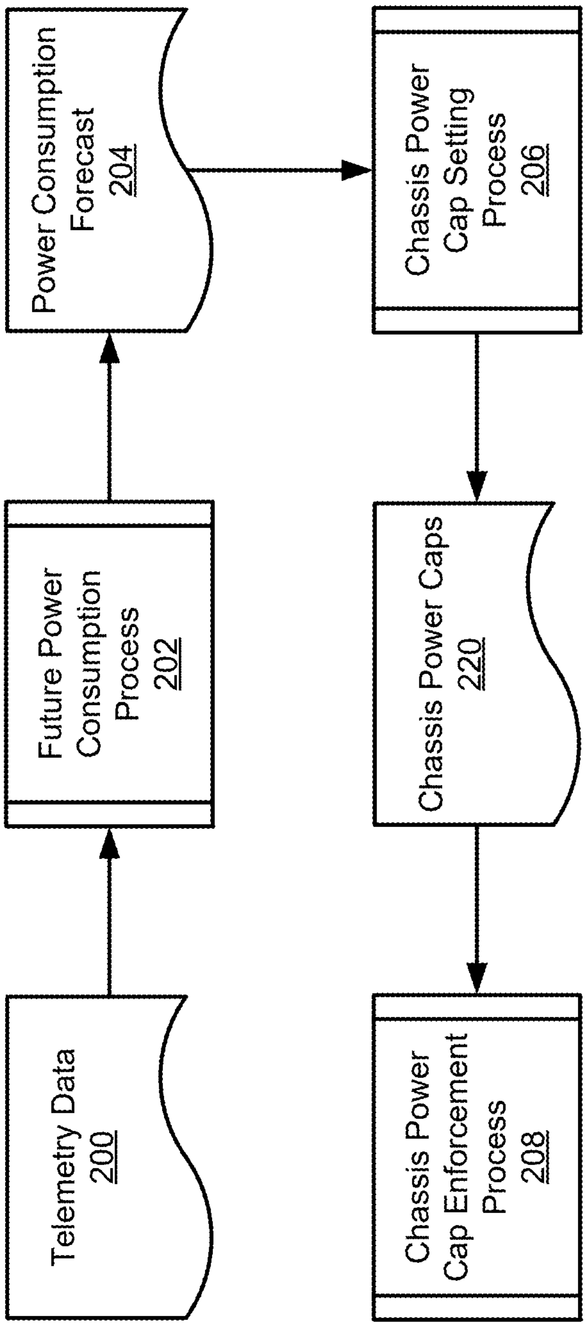
FIGS. 2A-2D show data flow diagrams illustrating operation of a system in accordance with an embodiment.
Figure 2B:
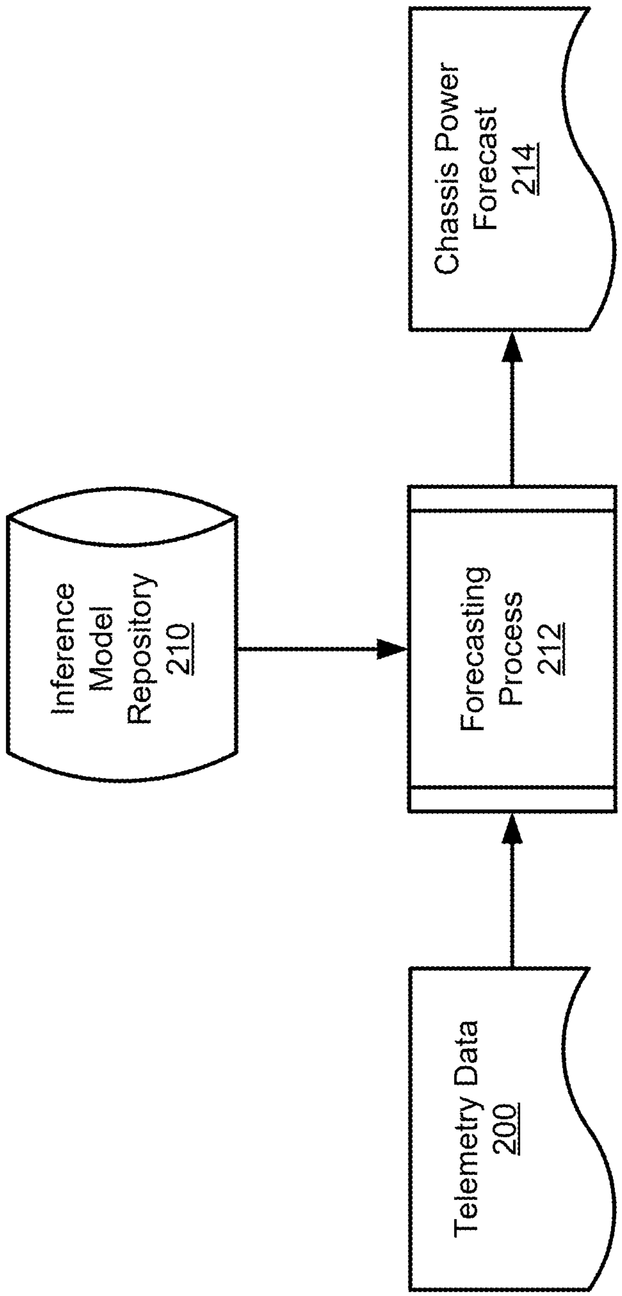
Figure 2C:
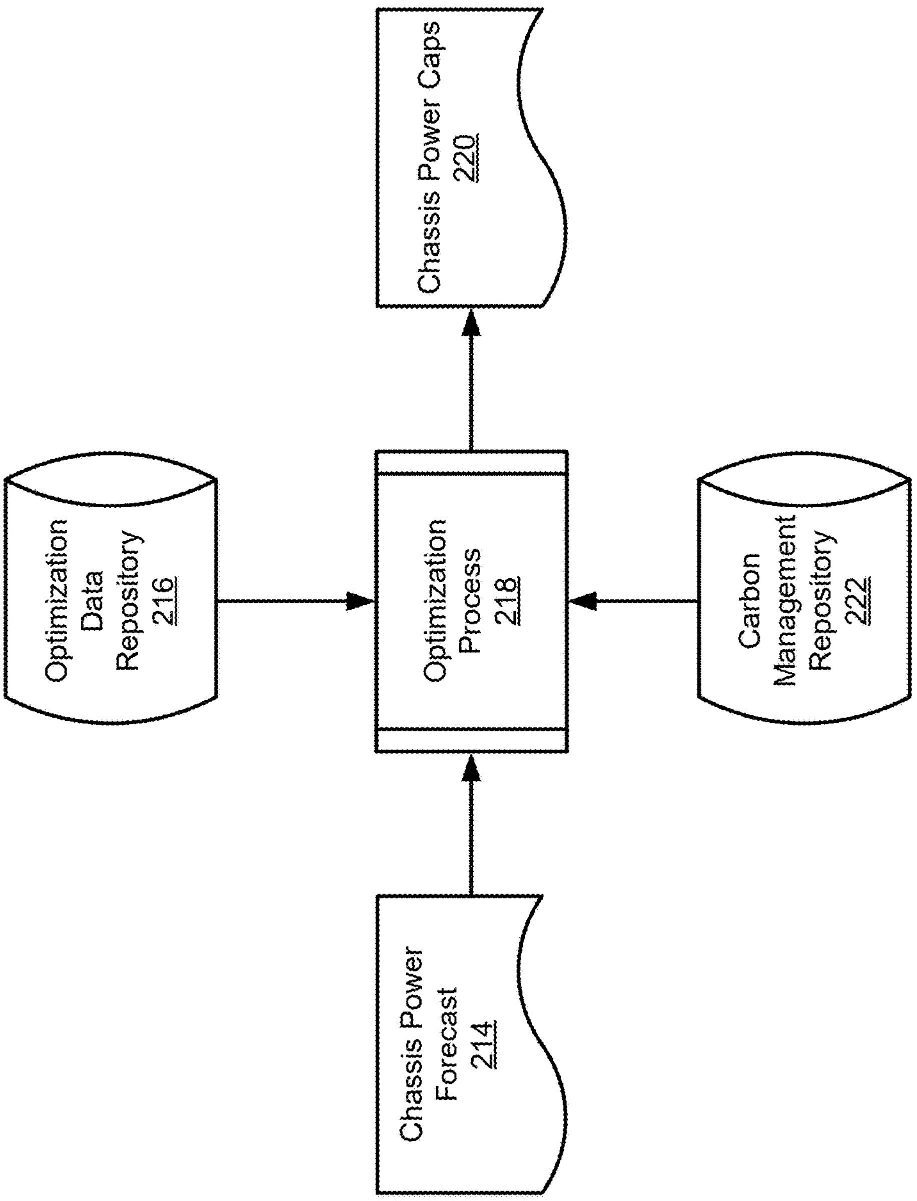
Figure 2D:
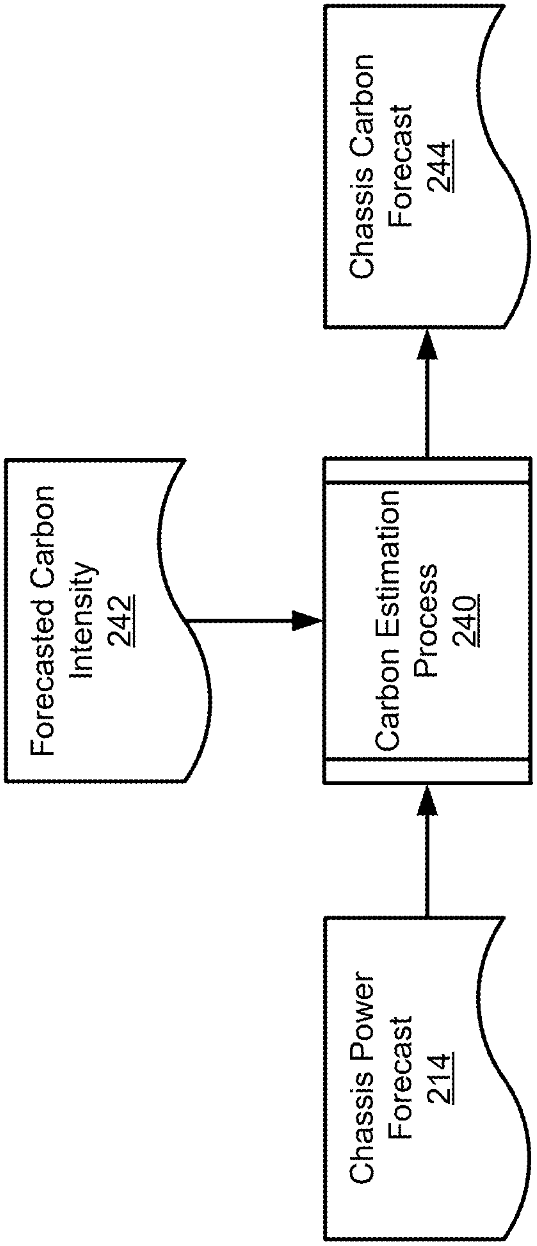
Figure 3:
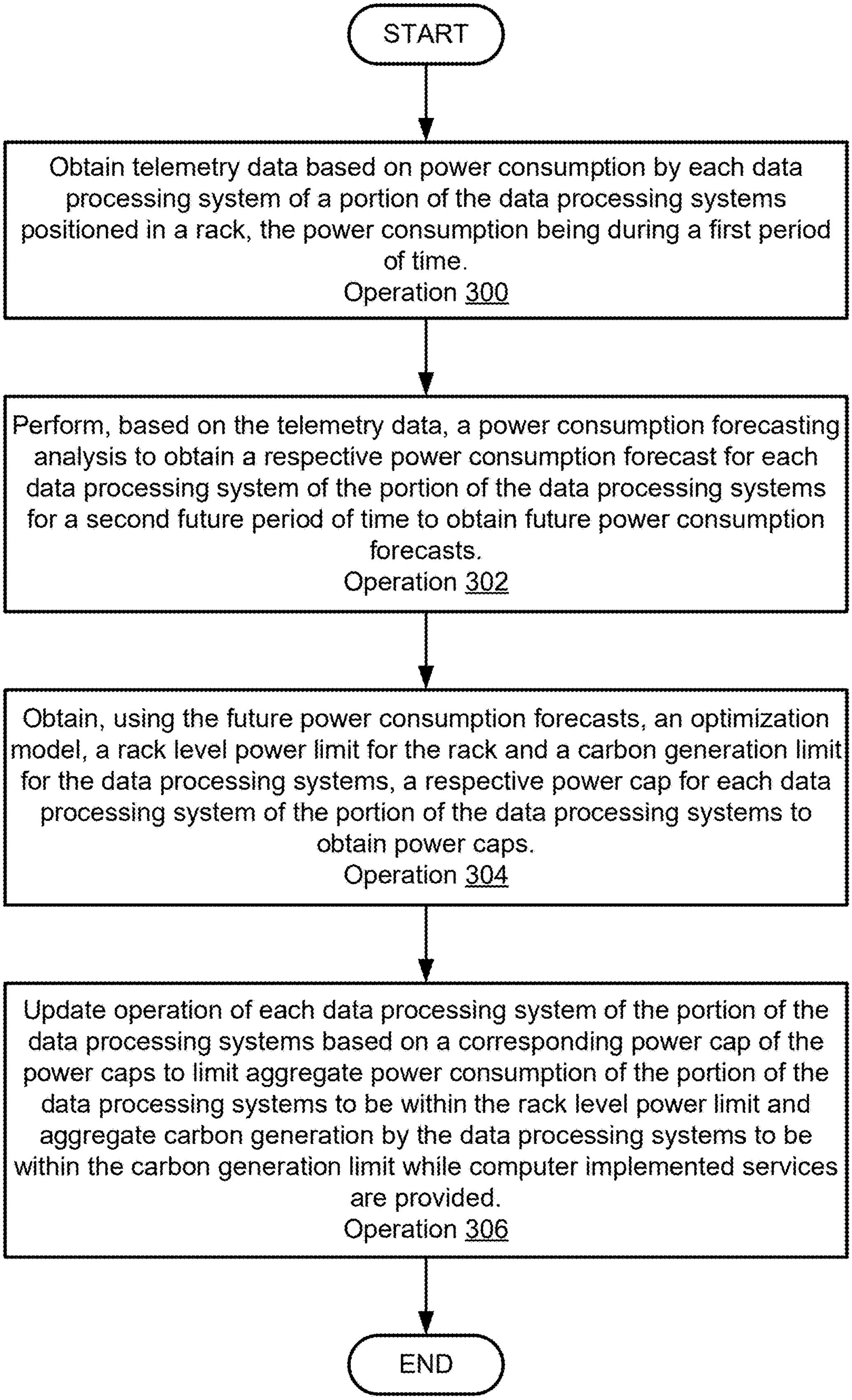
FIG. 3 shows a flow diagram illustrating a method in accordance with an embodiment.

While providing their functionality, any of rack 100 and forecasting manager 104 may perform all, or a portion, of the flows and methods shown in FIGS. 2A-3.

Any of (and/or components thereof) rack 100 and forecasting manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1A as including a limited number of specific components, a system in accordance with an embodiment may include fewer, additional, and/or different components than those components illustrated therein.

Turning to FIG. 1B, a diagram illustrating data processing system 140 in accordance with an embodiment is shown. Data processing system 140 may be similar to any of the data processing systems shown in FIG. 1A.

To provide computer implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Further, management controller 152 may collect telemetry data from hardware components 150. Management controller 152 may collect telemetry data by receiving the telemetry data from hardware components 150 through sideband channels 174. Hardware components 150 may include hardware within data processing system 140.

To send the telemetry data to forecasting manager 104, management controller 152 may send the telemetry data by channel 172 to network module 160. Network module 160 may include interface 164, by which the telemetry data may be sent. The telemetry data may be sent through wired/wireless channels 176 to forecasting manager 104.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 200, 204, etc.) is used to represent data structures, a second set of shapes (e.g., 202, 208, etc.) is used to represent processes performed using and/or that generate data, and a third set of shapes (e.g., 210, 216, etc.) is used to represent large scale data structures such as databases.

Turning to FIG. 2A, a first data flow diagram in accordance with an embodiment is shown. The first data flow diagram may illustrate data used in and data processing performed in generation and enforcement of power caps for chassis.

To generate and enforce power caps for chassis, future power consumption process 202 may be performed. During future power consumption process 202, telemetry data 200 may be ingested. Telemetry data 200 may include historical power consumption data for the chassis within a rack, each chassis including a data processing system of the data processing systems. Historical power consumption data may include power consumption by the chassis as a function of time.

Ingestion of telemetry data 200 by future power consumption process 202 may include ingesting telemetry data 200 into a forecasting algorithm. The forecasting algorithm may include a machine learning algorithm that has been trained to generate future power consumption forecasts. The machine learning algorithm may be one of a set of machine learning algorithms that include supervised, semi-supervised, unsupervised, and/or reinforcement machine learning algorithms.

Power consumption forecast 204 may be the future power consumption forecast. Power consumption forecast 204 may include a power consumption level as a function of future times. Power consumption forecast 204 may be ingested by chassis power cap setting process 206.

During chassis power cap setting process 206, power consumption forecast 204 may be ingested by an optimization algorithm. The optimization algorithm may solve an objective function. The function may include power caps for chassis within a rack, the function being set equal to a sum of under-allocated power for the chassis. Using power consumption forecast 204, the optimization algorithm may solve the objective function by modulating the power caps to minimize the under-allocated power.

The objective function may be constrained by two functions: (i) a sum of the power caps for each data processing system in the rack and (i) a sum of forecasted carbon emissions for each data processing system over a duration of time. The sum of the power caps may be expected to be less than and/or equal to a power capacity of the rack. Further, the sum of the forecasted carbon emissions may be expected to be less than and/or equal to a total carbon emission permitted for the rack. The total carbon emission permitted for the rack may be obtained, for example, from an administrator, a regulatory entity, etc. The administrator, the regulatory entity, etc. may determine the total carbon emission using at least one administrative regulation.

By modulating the power caps, chassis power caps 220 may be determined which distributes the total power available to the rack across the chassis. By distributing the total power available, under-allocation of the total power may occur and all power may be distributed among the chassis.

As an example, consider a rack with three data processing systems. The three data processing systems may run various software applications which affects hardware utilization. The software applications and the hardware utilization may further affect power consumption by the five data processing systems. The optimization algorithm may be used to modulate the power caps to distribute the total power available to the three data processing systems.

To use the total power available to the three data processing systems, the optimization algorithm may ingest power consumption forecast 204 and chassis power caps 220 for the three data processing systems. Power consumption forecast 204 may forecast that the three data processing systems have an average power use of 400 watts each and that the power use varies between 350 watts and 450 watts. However, chassis power caps 220 for the three data processing systems may be 350 watts, 400 watts, and 450 watts. Further, the total power available to the rack may be 1100 watts. To distribute the total power available to the three data processing systems, the optimization algorithm may set power caps to 366.6 watts for each of the three data processing systems to best distribute the total power available, Chassis power caps 220 may be ingested by chassis power cap enforcement process 208. During chassis power cap enforcement process 208, a power cap of chassis power caps 220 may be ingested by a baseboard management controller of a chassis. Upon ingestion of a power cap, the baseboard management controller may set the power cap for the chassis to meet a demand of a workload.

Thus, via the data flow illustrated in FIG. 2A, a system in accordance with an embodiment may in generate and enforce power caps for the chassis. Consequently, the rack may be more likely to be able to provide desired computer implemented services by using power consumption forecasts to determine power caps for data processing systems of the rack, including the forecasted carbon emissions in the determination of the power caps, etc.

Turning to FIG. 2B, a second data flow diagram in accordance with an embodiment is shown. The second data flow diagram may illustrate data used in and data processing performed in generation of chassis power forecasts.

To generate the chassis power forecasts, forecasting process 212 may be performed. During forecasting process 212, telemetry data 200 may be ingested. Telemetry data 200 is described in the description of FIG. 2A.

Forecasting process 212 may be performed similarly to future power consumption process 202 in FIG. 2A. Forecasting process 212 may ingest telemetry data 200 in forecasting manager 104 from FIG. 1A. Forecasting manager 104 may be in a cloud server and/or an onsite server. Forecasting manager 104 may process telemetry data 200 in a format that is readable by a forecasting algorithm.

The forecasting algorithm may be selected from inference model repository 210. Inference model repository 210 may include a set of forecasting algorithms that may be trained periodically. The forecasting algorithms may include machine learning algorithms. The forecasting algorithms may be trained periodically by ingesting a portion of test historical power consumption data and comparing a portion of test future power consumption forecast data to a portion of future power consumption forecast data from telemetry data 200.

A forecasting algorithm may be selected from inference model repository 210. The forecasting algorithm may be selected by choosing the forecasting algorithm that has been trained with multiple portions of the test historical power consumption forecast data and/or meets performance criteria for a forecasting algorithm. The performance criteria may be measured using regression, mean absolute error, precision, and/or recall.

The forecasting algorithm may ingest historical power consumption data from telemetry data 200. After ingesting of the historical power consumption data, the forecasting algorithm may generate future power consumption data. The future power consumption data may be included in chassis power forecast 214. The future power consumption data may include power consumption metrics at a set of future times for a set of chassis within a rack.

Thus, via the data flow illustrated in FIG. 2B, a system in accordance with an embodiment may in generate chassis power forecasts. Consequently, a rack may be more likely to be able to provide desired computer implemented services by generating the chassis power forecasts from the inference model, determining the chassis power forecasts from the historical power consumption data, etc.

Turning to FIG. 2C, a third data flow diagram in accordance with an embodiment is shown. The third data flow diagram may illustrate data used in and data processing performed in generation of chassis power caps.

To generate the chassis power caps, optimization process 218 may be performed. Optimization process 218 may be performed similarly to chassis power cap setting process 206. During optimization process 218, chassis power forecast 214 may be ingested. Future power consumption data from chassis power forecast 214 may be input into an objective function. The objective function may be a function of power caps for chassis within a rack. The power caps may be a series of maximum power limits for the chassis.

To set-up solving of the objective function, an optimization method may be selected. The optimization method may be selected from optimization data repository 216. The optimization method may be selected based on whether a global or local optimization solution is needed, sampling methods, generation of initial guessed for the optimization method, and/or use of first and/or second derivatives.

Further, the optimization method may use forecasted carbon emissions in the objective function. The forecasted carbon emissions may be used in the objective function by limiting the total carbon emission of data processing systems in the rack. The total carbon emission may include a sum of forecasted carbon emissions for each data processing system of the data processing systems over a duration of time.

At least one total carbon emission may be stored in carbon management repository 222. The at least one total carbon emission may be determined using at least one administrative regulation and/or a carbon emission calculator. In addition, the forecasted carbon emission for each of the data processing systems may be stored in carbon management repository 222. The forecasted carbon emissions may be based on a type of a data processing system, usage of the data processing system during a time of day, location of the data processing system, and/or a carbon emission factor by which a measure of power consumption of the data processing system is converted into a carbon emission.

After selection of the optimization method, the objective function may be solved. To solve the objection function, a sum of under-allocated power for each of the chassis may be minimized by varying the power caps. To minimize the under-allocated power, the optimization method may systematically vary the power caps towards a local and/or global minimum. The global minimum may include the power caps that yield a lowest under-allocated power while not exceeding, by the data processing systems, a total carbon emission. The local minimum may include the power caps that yield an under-allocated power that is higher than the global minimum.

By minimizing the objective function, chassis power caps 220 may be determined which distributes the total power available to the rack across the chassis. By distributing the total power available, the total power may be under-allocated and no power remains outstanding.

Thus, via the data flow illustrated in FIG. 2C, a system in accordance with an embodiment may generate chassis power caps. Consequently, a rack may be more likely to be able to provide desired computer implemented services by distributing a total power across the rack, maintaining, by the rack, a threshold of the total carbon emission, etc.

Turning to FIG. 2D, a fourth data flow diagram in accordance with an embodiment is shown. The fourth data flow diagram may illustrate data used in and data processing performed in generation of chassis carbon forecasts.

The chassis carbon forecasts may include forecasted carbon emissions of at least one data processing system. To generate chassis carbon forecast 244, which includes the chassis carbon forecasts, carbon estimation process 240 may be performed. During carbon estimation process 240, chassis carbon forecast 244 may be determined using chassis power forecast 214 and/or forecasted carbon intensity 242.

Future power consumption data may be included in chassis power forecast 214. The future power consumption data may include power consumption metrics at a set of future times for a set of chassis within a rack. FIG. 2B describes a process of determining chassis power forecast 214.

In addition, forecasted carbon intensity 242 may include a forecasted carbon emission factor of power consumed by the rack. The forecasted carbon emission factor may convert power, energy, etc. into a measure of carbon emission. The forecasted carbon emission factor may be determined by an administrator, a regulatory entity, etc.

During carbon estimation process 240, chassis carbon forecast 244 may be determined. Chassis carbon forecast 244 may be determined by applying chassis power forecast 214 (e.g., in units of, for example, power, energy, etc.) with forecasted carbon intensity 242 (e.g., in the units, for example, of grams of $CO_2$/kWh, moles of $CO_2$/kWh, grams of $CO_2$/Watts, moles of $CO_2$/Watts, etc.) to generate chassis carbon forecast 244 (in the units of grams of $CO_2$, moles of $CO_2$, parts per million of $CO_2$, etc.).

Thus, via the data flow illustrated in FIG. 2D, a system in accordance with an embodiment may generate chassis carbon forecasts. Consequently, a rack may be more likely to be able to provide desired computer implemented services by equating a measure of power consumption to the measure of a carbon emission, etc.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1B may perform various methods to manage power consumption by data processing systems. FIG. 3 illustrates a method that may be performed by the components of the system of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing power consumption by data processing systems in accordance with an embodiment is shown. The method may be performed, for example, by any of the components of the system of FIG. 1A-1B, and/or other components not shown therein.

At operation 300, telemetry data may be obtained based on power consumption by each data processing system of a portion of the data processing systems positioned in a rack, the power consumption being during a first period of time. The telemetry data may be obtained by receiving the telemetry data from a baseboard management controller of each data processing system.

At operation 302, a power consumption forecasting analysis may be performed, based on the telemetry data, to obtain a respective power consumption forecast for each data processing system of the portion of the data processing systems for a second future period of time to obtain future power consumption forecasts.

The power consumption forecasting analysis may be performed by ingesting, by a forecasting inference model, the telemetry data to perform a forecasting analysis of power consumption by each data processing system of the portion of the data processing systems to obtain the future power consumption forecasts. The forecasting inference model may ingest the telemetry data by receiving the telemetry data from a data processer that receives the telemetry data from each data processing system and converts the telemetry data into a format for the forecasting inference model to ingest.

At operation 304, a respective power cap for each data processing system of the portion of the data processing systems may be obtained, using the future power consumption forecasts, an optimization model, a rack level power limit for the rack, and a carbon generation limit for the data processing systems, to obtain power caps. The respective power cap for each data processing system of the portion of the data processing systems may be obtained by (i) ingesting, by the optimization model, the future power consumption forecasts, the rack level power limit for the rack, and the carbon generation limit; (ii) performing, using the optimization model, the future power consumption forecasts and the rack level power limit for the rack, an optimization of the respective power cap for each data processing system of the portion of the data processing systems; and (iii) obtaining, from the optimization model, the power caps to limit the aggregate power consumption of the portion of the data processing systems to be within the rack level power limit.

The future power consumption forecasts and the rack level power limit for the rack may be ingested by inserting the future power consumption forecasts and the rack level power limit for the rack into an objective function. The objective function may have the respective power cap for each data processing system and the future power consumption forecasts as variables. The carbon generation limit may be a constraint for the objective function. The carbon generation limit may be a function of a sum of forecasted carbon emissions for each data processing system. The forecasted carbon emissions may be determined using the future power consumption forecasts. The forecasted carbon emissions may be determined by converting, using a forecasted carbon intensity, the future power consumption forecasts into the forecasted carbon emissions.

The optimization of the respective power cap for each data processing system of the portion of the data processing systems may be performed by using a forecasted carbon intensity for power generation during the second period of time to estimate carbon generation due to each power cap for each data processing system. The forecasted carbon intensity may be used by generating the estimate carbon generation as a product of the forecasted carbon intensity and the power. Further, the optimization may be performed by minimizing a sum of under-allocated power for each data processing system. The power caps may be obtained by solving for a global minimum and/or a local minimum in a minimization of the objective function. The global minimum may be a function of first power caps that generate a lowest value for the objective function. The local minimum may be a function of second power caps that generates a value for the objective function that is higher than the global minimum.

At operation 306, operation of each data processing system of the portion of the data processing systems may be updated based on a corresponding power cap of the power caps to limit aggregate power consumption of the portion of the data processing systems to be within the rack level power limit while computer implemented services are provided. The operation of each data processing system of the portion of the data processing systems may be updated by (i) ingesting, by a baseboard management controller, a power cap of the power caps to limit the aggregate power consumption of the portion of the data processing systems to be within the rack level power limit; and (ii) updating, by the baseboard management controller, the power consumption of the portion of the data processing systems based on power consumption specified by the power cap of the power caps.

The power cap of the power caps may be ingested by a baseboard management controller by receiving, by the baseboard management controller, the power cap of the power caps from the optimization model. The power consumption of the portion of the data processing systems may be updated by applying, by the baseboard management controller, the power caps of the power caps as a maximum limit for power by the data processing system. The method may end following operation 306.

Thus, via the method shown in FIG. 3, embodiments disclosed herein may managing power consumption by data processing systems to provide computer implemented services. By managing power consumption, the data processing systems may provide the computer implemented services by anticipating power consumption needs, allocating a total power available to the data processing systems, etc.

Figure 4:
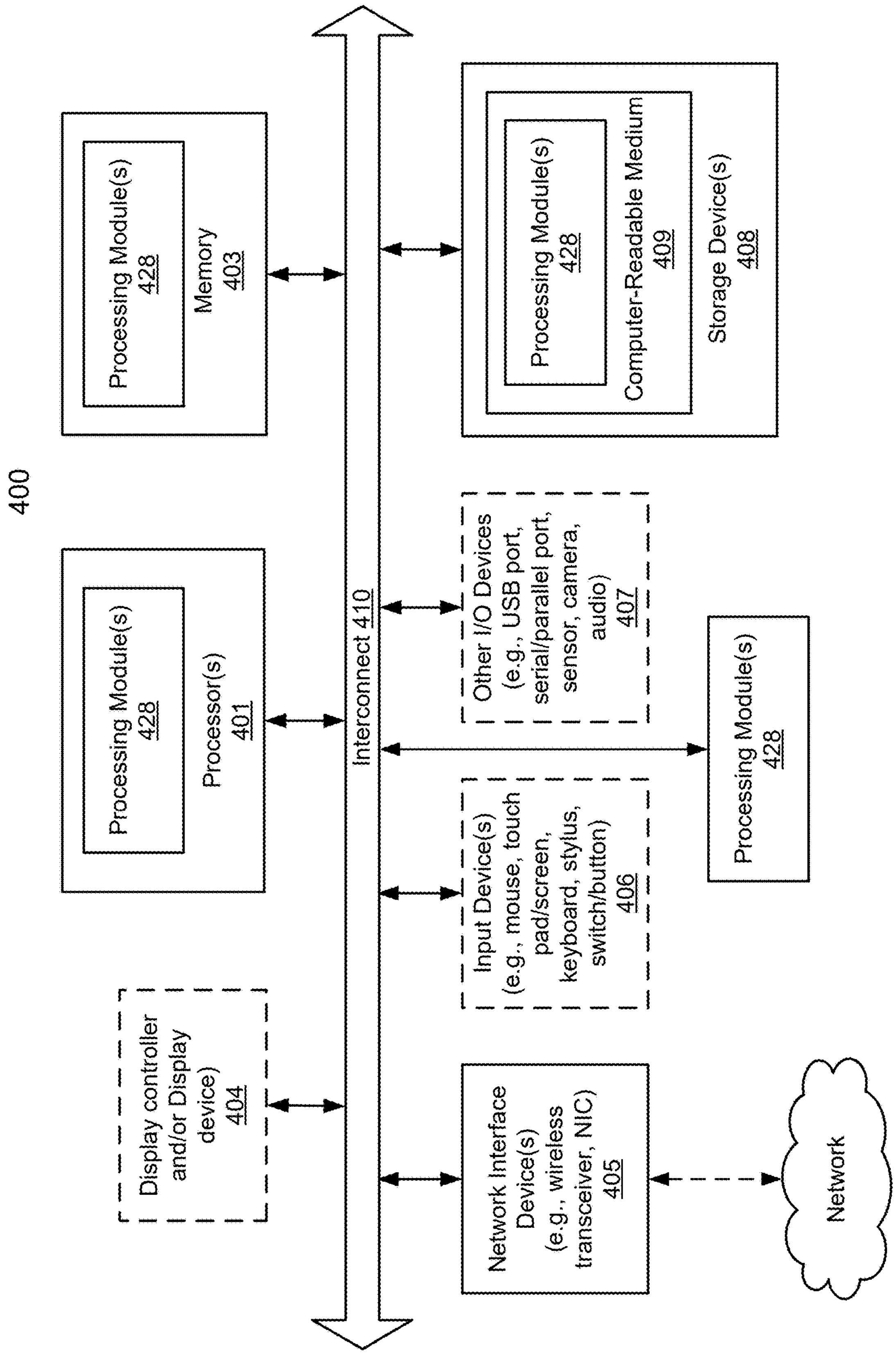
FIG. 4 shows a block diagram illustrating a data processing system in accordance with an embodiment.

Any of the components illustrated in FIGS. 1A-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing power consumption by data processing systems, the method comprising:

obtaining, for each data processing system of a portion of the data processing systems in a rack, telemetry data based on power consumption during a first period of time, wherein each data processing system of the portion of the data processing systems comprises a corresponding management controller that obtains the telemetry data from hardware resources of the data processing system via a sideband channel that is separate from an in-band channel of the hardware resources, and wherein, for each data processing system of the portion of the data processing systems, the telemetry data is obtained from the corresponding management controller via an out-of-band communication channel that is separate from the in-band channel of the hardware resources;

performing, based on the telemetry data, a power consumption forecasting analysis to obtain a respective power consumption forecast for each data processing system of the portion of the data processing systems for a second future period of time to obtain future power consumption forecasts;

obtaining, using the future power consumption forecasts, an optimization model, a rack level power limit for the rack, and a carbon generation limit for the data processing systems, a respective power cap for each data processing system of the portion of the data processing systems to obtain power caps; and updating operation of each data processing system of the portion of the data processing systems based on a corresponding power cap of the power caps to limit aggregate power consumption of the portion of the data processing systems to be within the rack level power limit and aggregate carbon generation by the data processing systems to be within the carbon generation limit while computer implemented services are provided, wherein, for each data processing system of the portion of the data processing systems, the corresponding power cap is provided to the corresponding management controller via the out-of-band communication channel and applied by the corresponding management controller via the sideband channel.

2. The method of claim 1, wherein obtaining the respective power cap for each data processing system of the portion of the data processing systems comprises:

ingesting, by the optimization model, the future power consumption forecasts, the rack level power limit for the rack, and the carbon generation limit;

performing, using the optimization model, the future power consumption forecasts, the carbon generation limit, and the rack level power limit for the rack, an optimization of the respective power cap for each data processing system of the portion of the data processing systems; and obtaining, from the optimization model, the power caps to limit.

3. The method of claim 2, wherein performing the optimization comprises:

using a forecasted carbon intensity for power generation during the second future period of time to estimate carbon generation due to each power cap for each data processing system.

4. The method of claim 3, wherein the forecasted carbon intensity specifies a rate of carbon generated for generation of power during the second future period of time.

5. The method of claim 2, wherein the carbon generation limit specifies a maximum amount of carbon authorized for emission into an environment due to operation of the data processing systems.

6. The method of claim 1, wherein the rack level power limit is a maximum amount of power that is able to be supplied to the rack.

7. The method of claim 6, wherein in an instance of the obtaining, the power caps in aggregate are less than the rack level power limit.

8. The method of claim 1, wherein each data processing system of the portion of the data processing systems comprises a single network module that separately advertises network endpoints for the corresponding management controller and the hardware resources of the data processing system such that first communications meant for the hardware resources never flow through the corresponding management controller and second communications meant for the corresponding management controller never flow through the hardware resources.

9. The method of claim 7, wherein in the instance of the obtaining, the carbon generation limit restricts power consumption by the data processing systems to be less than the rack level power limit.

10. The method of claim 9, wherein the carbon generation limit is used as a constraint in an optimization process that incentivizes power consumption by the data processing systems up to the rack level power limit.

11. A non-transitory machine-readable medium having instructions stored therein, which when executed by a processor, cause the processor to perform operations for managing power consumption by data processing systems, the operation comprising:

obtaining, for each data processing system of a portion of the data processing systems in a rack, telemetry data based on power consumption during a first period of time, wherein each data processing system of the portion of the data processing systems comprises a corresponding management controller that obtains the telemetry data from hardware resources of the data processing system via a sideband channel that is separate from an in-band channel of the hardware resources, and wherein, for each data processing system of the portion of the data processing systems, the telemetry data is obtained from the corresponding management controller via an out-of-band communication channel that is separate from the in-band channel of the hardware resources;

performing, based on the telemetry data, a power consumption forecasting analysis to obtain a respective power consumption forecast for each data processing system of the portion of the data processing systems for a second future period of time to obtain future power consumption forecasts;

obtaining, using the future power consumption forecasts, an optimization model, a rack level power limit for the rack, and a carbon generation limit for the data processing systems, a respective power cap for each data processing system of the portion of the data processing systems to obtain power caps; and updating operation of each data processing system of the portion of the data processing systems based on a corresponding power cap of the power caps to limit aggregate power consumption of the portion of the data processing systems to be within the rack level power limit and aggregate carbon generation by the data processing systems to be within the carbon generation limit while computer implemented services are provided, wherein, for each data processing system of the portion of the data processing systems, the corresponding power cap is provided to the corresponding management controller via the out-of-band communication channel and applied by the corresponding management controller via the sideband channel.

12. The non-transitory machine-readable medium of claim 11, wherein obtaining the respective power cap for each data processing system of the portion of the data processing systems comprises:

ingesting, by the optimization model, the future power consumption forecasts, the rack level power limit for the rack, and the carbon generation limit;

performing, using the optimization model, the future power consumption forecasts, the carbon generation limit, and the rack level power limit for the rack, an optimization of the respective power cap for each data processing system of the portion of the data processing systems; and obtaining, from the optimization model, the power caps to limit.

13. The non-transitory machine-readable medium of claim 12, wherein performing the optimization comprises:

using a forecasted carbon intensity for power generation during the second future period of time to estimate carbon generation due to each power cap for each data processing system.

14. The non-transitory machine-readable medium of claim 13, wherein the forecasted carbon intensity specifies a rate of carbon generated for generation of power during the second future period of time.

15. The non-transitory machine-readable medium of claim 12, wherein the carbon generation limit specifies a maximum amount of carbon authorized for emission into an environment due to operation of the data processing systems.

16. A data processing system, comprising:

a processor; and a memory coupled to the processor to store instructions, which when executed by the processor, cause the processor to perform operations for managing power consumption by data processing systems, the operations comprising:

obtaining, for each data processing system of a portion of the data processing systems in a rack, telemetry data based on power consumption during a first period of time, wherein each data processing system of the portion of the data processing systems comprises a corresponding management controller that obtains the telemetry data from hardware resources of the data processing system via a sideband channel that is separate from an in-band channel of the hardware resources, and wherein, for each data processing system of the portion of the data processing systems, the telemetry data is obtained from the corresponding management controller via an out-of-band communication channel that is separate from the in-band channel of the hardware resources;

performing, based on the telemetry data, a power consumption forecasting analysis to obtain a respective power consumption forecast for each data processing system of the portion of the data processing systems for a second future period of time to obtain future power consumption forecasts;

obtaining, using the future power consumption forecasts, an optimization model, a rack level power limit for the rack, and a carbon generation limit for the data processing systems, a respective power cap for each data processing system of the portion of the data processing systems to obtain power caps; and updating operation of each data processing system of the portion of the data processing systems based on a corresponding power cap of the power caps to limit aggregate power consumption of the portion of the data processing systems to be within the rack level power limit and aggregate carbon generation by the data processing systems to be within the carbon generation limit while computer implemented services are provided, wherein, for each data processing system of the portion of the data processing systems, the corresponding power cap is provided to the corresponding management controller via the out-of-band communication channel and applied by the corresponding management controller via the sideband channel.

17. The data processing system of claim 16, wherein obtaining the respective power cap for each data processing system of the portion of the data processing systems comprises:

ingesting, by the optimization model, the future power consumption forecasts, the rack level power limit for the rack, and the carbon generation limit;

performing, using the optimization model, the future power consumption forecasts, the carbon generation limit, and the rack level power limit for the rack, an optimization of the respective power cap for each data processing system of the portion of the data processing systems; and obtaining, from the optimization model, the power caps to limit.

18. The data processing system of claim 17, wherein the carbon generation limit specifies a maximum amount of carbon authorized for emission into an environment due to operation of the data processing systems.

19. The data processing system of claim 17, wherein performing the optimization comprises:

using a forecasted carbon intensity for power generation during the second future period of time to estimate carbon generation due to each power cap for each data processing system.

20. The data processing system of claim 19, wherein the forecasted carbon intensity specifies a rate of carbon generated for generation of power during the second future period of time.

* * * * *